United States Patent [19]
Colgan

[11] 3,915,615
[45] Oct. 28, 1975

[54] EXTRUSION DIE
[75] Inventor: Joseph Dennis Colgan, Fort Worth, Tex.
[73] Assignee: American Cyanamid Company, Stamford, Conn.
[22] Filed: Oct. 23, 1974
[21] Appl. No.: 517,139

[52] U.S. Cl. ............... 425/464; 425/382; 425/467
[51] Int. Cl.² ........................................... B29F 3/04
[58] Field of Search ............... 425/464, 382, 467

[56] References Cited
UNITED STATES PATENTS
| | | |
|---|---|---|
| 1,155,777 | 10/1915 | Whritner ................ 425/376 X |
| 2,083,512 | 6/1937 | Bauriedel ............... 425/382.2 |
| 2,436,201 | 2/1948 | Cole ...................... 264/176 R X |
| 3,502,763 | 3/1970 | Hartmann ............... 425/72 X |

Primary Examiner—Al Lawrence Smith
Assistant Examiner—J. T. Zatarga
Attorney, Agent, or Firm—William J. van Loo

[57] ABSTRACT

An extrusion die for an auger type extruder is disclosed which comprises a conventional die plate having enlarged orificies, a positioning means having enlarged orifices arranged in linear rows, and conduit means having ends inserted in an orifice of the die plate and an orifice of the positioning means.

6 Claims, 6 Drawing Figures

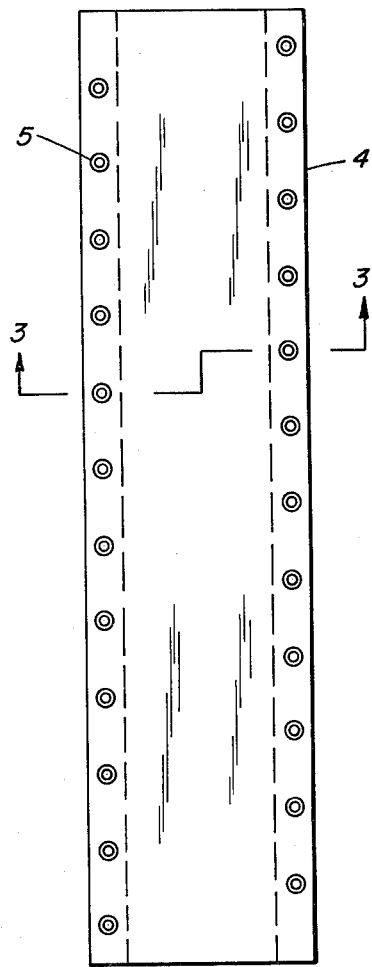
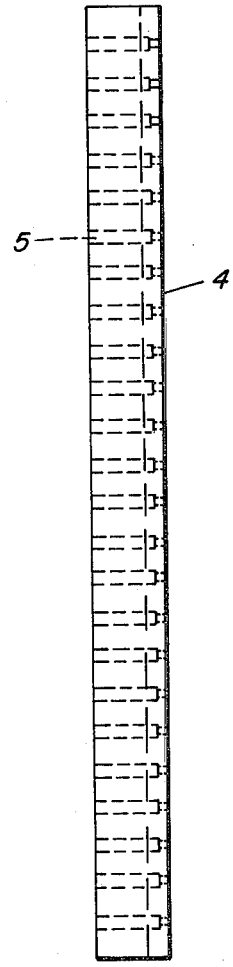
FIG.1  FIG.2
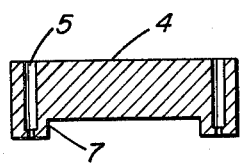
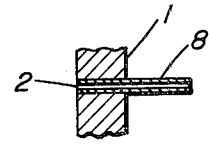
FIG.3  FIG.6

EXTRUSION DIE

This invention relates to a modified die plate for an auger type extruder. More particularly, the invention relates to such a die plate having conduit means associated with orifices therein and positioning means for said conduits whereby extrudate strands are placed in linear rows for further processing.

In the manufacture of formed catalysts or catalyst supports, extrusion is frequently employed to provide such materials in distinct form. Typically, the material to be extruded is prepared so as to have the proper consistency for extrusion and then supplied to a conventional auger type extrusion device. The auger forces the extrusion paste through a die plate having orifices of the desired size and shape to form continuous strands of cross-section conforming to the orifices. Strand diameters are commonly in the range of about one thirty-second to one-fourth inch. The strands are subjected to additional operations such as drying, calcination, and impregnation during which they break into small particles of varying length.

In certain instances, it is desirable to obtain particles which have uniform lengths of a specific value. Particles of uniform length can be obtained by insertion of appropriate processing operations at one or another stage in the manufacturing process. For example, dried strands can be subjected to a combined operation in which their length is reduced and lengths of specific value are collected. A disadvantage of this procedure is that substantial amounts of undersized particles are obtained which must be recycled. The recycling can adversely affect properties of the extrudates formed containing recycle particles.

In order to obtain extrudates of uniform lengths, it is more common to cut the strands as they emerge from the extrusion die. One cutting procedure involves a rotating knife blade which wipes the die face. To obtain particles of uniform length with this device, it is necessary that strand velocity from all orifices be the same. The extrudate length is controlled by rotational speed of the knife blade. Another method involves use of a breaker plate which is situated a short distance from the face of the extrusion die. The breaker plate is generally a flat rotating disc or moving belt with the direction of motion perpendicular to the direction of strand flow. As the strands reach the breaker plate they are broken at the die plate face. The distance between the die plate face and the breaker plate controls the length of the extrudate and variations in strand velocities are not critical.

With the breaker plate procedure, however, the length reduction, or cutting, operation deteriorates as the distance between individual extrudate strands decreases or as the velocity of the strands increases or both. Deterioration is reflected in production of substantial amounts of undersized particles, or fines, or particle deformation caused by interference between particles or particles and die-plate face. Since distance between strands, which is reflected by the number of strands emerging, and strand velocity mutually determine effective operation, proper regulation thereof places a limit on the rate of extrudate production, that is, the auger speed or revolutions per minute for a given extruder. This limitation is particularly acute on large extruders in which the potential production rate increases to a greater extent with increases in auger diameter than does the effective die plate area.

To overcome this problem and make high extrusion rates compatible with satisfactory strand cutting, several innovations have been attempted. In one innovation, a bell-shaped transition piece was added between the discharge end of the extruder barrel and the die plate. The bell-shaped piece enlarges the die plate and enables an increase in orifices to be accomplished, thereby reducing velocity of the strands.

In another innovation, a fish-tail shaped transition piece was added between the extruder barrel and the die plate. This piece changes the basic shape of the die-plate from circular to rectangular and thus tends to reduce opportunities for interference between particles.

Neither of these transition pieces, however, has proved to be wholly satisfactory. In some instances, extrudate flow through the displaced die plate cannot be obtained because of the large inventory of extrusion paste between the end of the auger and the die plate. In other instances, uniformity of extrudate flow distribution through the orifices is very poor. In still other instances, the rate of extrudate flow and uniformity of strand velocity rapidly deteriorate because of the formation of hard, dry masses of extrusion paste between the auger and die plate which impede flow.

The shape of an extrusion barrel is circular and the die plate is, accordingly, circular shaped. Orifices in the die plate are customarily arranged in circular pattern for most effective operation. It is also necessary to employ as many orifices in the die plate as can be entered for efficient operation. Positioning of the orifices causes interference or intermingling of one emerging extrudate strand with others and complicates operations which are intended to provide particles of uniformly reduced length. Thus, the problems associated with production of extrudates of uniform length inherently arise from the nature of the extrusion device employed.

Therefore, there continues to exist the need for extrusion dies which provide extrudates of uniform length while enabling high production rates to be achieved and overcoming the difficulties associated with former dies used in conjunction with auger type extruders.

In accordance with the present invention, there is provided a die plate for an auger type extruder which comprises (a) a conventional circular die plate having a plurality of orifices arranged in circular pattern about the center of said die plate, the diameter of which orifices being greater than that of the desired extrudates and equal to a value D, (b) a positioning means containing a plurality of orifices in a linear row, the number of orifices being equal to that of the circular plate and being of a diameter D, and (c) conduit means having two ends, one of which being positioned within an orifice in the circular die plate and the other of which being positioned in an orifice of the positioning means, said conduit means having an outer diameter substantially equal to D and an inner diameter substantially equal to the diameter of the extrudate desired.

The die plate of the present invention enables extrudates of substantially uniform length to be obtained at high production rates while avoiding the difficulties associated with former die plates.

The die plate in a preferred embodiment is illustrated in FIGS. 1–6, in which

FIG. 1 is a plane view of the rear face of the positioning means,

FIG. 2 is a top view thereof,

FIG. 3 is a side view thereof showing in section the nature of orifices therein, FIG. 6 is a sectional view of the structural relationship between the conduits and the die plate.

Figure 4:
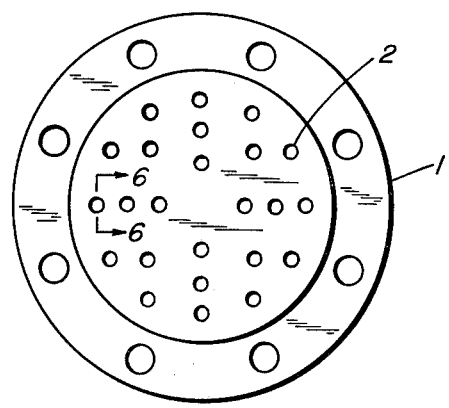
FIG. 4 is a plane view of the circular die plate.

The die plate of the present invention consists of three essential components, (1) the conventional circular die plate with orifices larger than the desired extrudate diameter (2) conduit means of outside diameter corresponding to the desired extrudate diameter, and (3) positioning means containing orifices corresponding to the outside diameter of the conduit means, the orifices being linearly disposed in a row.

The circular die plate is one that is normally mounted to the barrel of the auger type extruder but is distinct in that the orifice diameter is larger than the diameter of the desired extrudate. The orifices are arranged in circular pattern about the center of the die plate. The maximum number of orifices is preferably employed, generally arranged in a series of concentric circular rows. All orifices are of the same diameter, which is greater than that of the desired extrudate and corresponds to the outer diameter of conduit means that has an inner diameter substantially equal to the diameter of the extrudate desired. In one embodiment, the orifices may be ordinary drilled holes. In another embodiment, they may be threaded holes for engagement of threaded ends of conduit means. In yet another embodiment, they may contain an enlarged diameter section on the inner die plate face for positioning of a flanged conduit means.

The positioning means is a rectangular block of suitable material containing a corresponding number of orifices of the same size as in the circular die plate. The orifices are disposed in one or more linear rows. The orifice may be threaded or plain. In a preferred embodiment, the diameter of the orifice on the face of the positioning means is slightly larger than the diameter of the desired extrudate. A large diameter equal to the diameter of the conduit means D extends from the back to a point about one-sixteenth inch from the face, at which point a diameter smaller than D but larger than the inner diameter of the conduit means commences and continues to the face. In this embodiment, the positioning means provides suitable distance for securing the conduit means while at the same time providing an all-metal face that can be wiped with a cutting blade without danger of contacting the conduit means. The positioning means is mounted securely to the extruder by suitable means while minimizing the lengths of the conduit means involved. The orifices in the positioning means may be disposed in a single linear row for optimum strand positioning. Alternatively, several linear rows may be employed in which orifices in adjacent rows are offset. The linear rows of orifices may be disposed horizontally, vertically, or at any angle of inclination desired.

Connecting the orifices of the circular die plate with the orifices of the positioning means are conduit means. The conduit means may be of any suitable material having the proper outside and inside diameters. Typically, plastic materials such as high pressure nylon tubing, are employed. Other suitable materials include metal, glass, ceramic and other plastic tubing. It is necessary that the outside diameter of the conduit means be substantially equal to the diameter of the orifices in the circular die plate and positioning means, the larger diameter of the positioning means when two diameters are involved. The conduit means is secured within the orifices of the circular die plate and positioning means such as by an adhesive, engageable threads, flaring, etc. Conveniently, the conduit means is secured by means of an epoxy type adhesive. The inner diameter of the conduit means will be substantially that desired for the extrudates. The length of the individual conduits will be minimized and just sufficient to afford favorable location of the positioning means in front of the circular die plate. No special arrangement of conduit means with respect to orifices of the circular die plate and positioning means connected is necessary, but it is preferred to minimize path lengths from die plate to positioning means of individual conduits. It is also preferable to avoid sharp turns in connecting the orifices and this is avoided by placing the positioning means a suitable distance in front of the die plate. Generally a distance of about 4 to 6 inches between die plate and positioning means is adequate.

Figure 5:
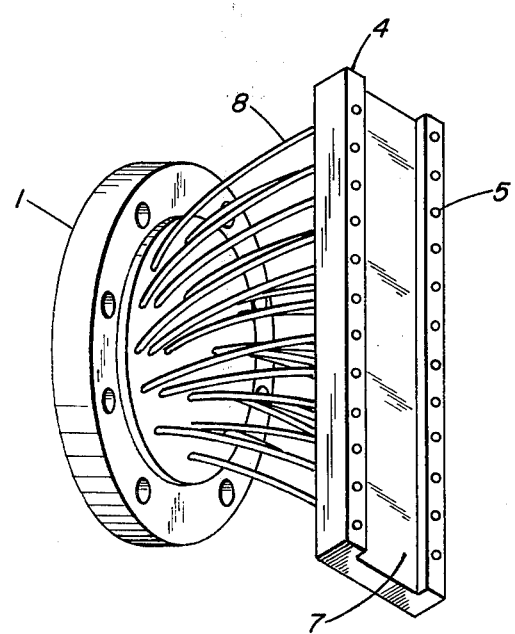
FIG. 5 is a three-dimensional view of the positioning means attached to the circular die plate by the conduit means.

The invention is more fully illustrated by the accompanying drawings. FIG. 4 shows a circular die plate, 1, having three concentric rings of orifices, 2. For convenience arrangement of orifices would involve many more orifices, such as for example 92 orifices. FIG. 1 shows the face of a positioning means, 4, in which 24 orifices, 5, are arranged in two linear rows having 12 orifices each, with orifices offset in the adjacent rows. FIG. 2 shows a top view of the positioning means, 4 showing that the orifices, 5, have a narrower diameter at the face than at the back, the wider diameter extending up to one-sixteenth of an inch from the face. FIG. 3 is a sectional view along lines 3, 3 of FIG. 2 showing the milled out portion of the positioning means, 4 between the orifice rows which is convenient for mounting purposes. FIG. 5 shows the fully assembled die plate with conduit means, 8 inserted in the orifices, 2 of the positioning means. FIG. 6 is a sectional view along 6, 6 of FIG. 5 and shows the positioning of the conduits in the orifices of the die plate.

In practice, a circular die plate, 1, having 92 orifices of five thirty-seconds inch diameter was prepared for a conventional auger type extruder having a barrel 6 inches in diameter. A positioning means, 4, was prepared from a carbon steel block 12 inches long, 3 inches wide, and 1 inch thick. Two linear rows of 46 orifices, 5, extending lengthwise of the block were prepared. The orifices were five thirty-seconds inch in diameter from the back to one-sixteenth inch from the face. At the face connecting the five thirty-seconds inch orifices and centered therein were one-eighth inch orifices. The orifices were drilled at a spacing of one-fourth inch between centers and the orifices of each row were offset so that the centers of holes in one row were between centers of holes in the other rows. A channel, 7, 2 inches wide by one-fourth inch deep was milled out of the face centered in the lengthwise direction of the block. High pressure nylon tubing (1,000 psi) with an outer diameter of five thirty-seconds inch and inner diameter of 0.106 inch was employed as conduit means, 8. The tubing was inserted as lengths in each orifice of the circular die plate so as to be flush with the inside face of the circular die plate. The tubing was secured in place by means of an epoxy adhesive applied to the walls of the die plate orifices. The die plate, after setting of the adhesive was attached to the extruder by conventional bolting means. The positioning means was then bolted to two braces which were welded to the die plate edges. The face of the positioning means was thus positioned parallel to the die plate at a distance of 5 inches therefrom with the rows of orifices in the positioning means vertically disposed. The free ends of the tubing were then inserted in the back of the positioning means to meet the edge of the one-eighth inch bore, the nature of the fit providing suitable securing. The lengths of individual tubing were reduced to minimize tube length.

Operation of the extruder using a rotating disc breaker plate enabled continuous production of uniform sized extrudates to be achieved without difficulty

I claim:

1. A die plate for an auger type extruder which comprises: (a) a conventional circular die plate having a plurality of orifices arranged in circular pattern about the center of said die plate, the diameter of which orifices being greater than that of the desired extrudates and equal to a value D; (b) a positioning means containing a plurality of orifices in a linear row, the number of orifices being equal to that of the circular die plate and being of a diameter D; and (c) a plurality of conduits each having two ends, one of which being positioned within a respective orifice in the circular die plate and the other of which is positioned in a respective orifice of the positioning means, each said conduit having an outer diameter substantially equal to D and an inner diameter substantially equal to the diameter of the extrudate desired.

2. The die plate of claim 1 wherein the orifices of the positioning means are arranged in two linear rows with orifices of one row offset from orifices of the other row.

3. The die plate of claim 1 wherein the conduit means is high pressure nylon tubing.

4. The die plate of claim 1 wherein the conduit means is secured in the orifices by means of an epoxy adhesive.

5. The die plate of claim 1 wherein the orifices of the positioning means are of a diameter D for a distance of up to one-sixteenth inch from the face of the positioning means and for the remaining thickness of the positioning means are of a diameter smaller than D but larger than the inner diameter of the conduit means.

6. The die plate of claim 1 wherein the linear rows of the positioning means are vertically disposed.

* * * * *